Oct. 30, 1945.  J. W. WOHLHIETER  2,388,201
CLAMP
Filed June 8, 1943
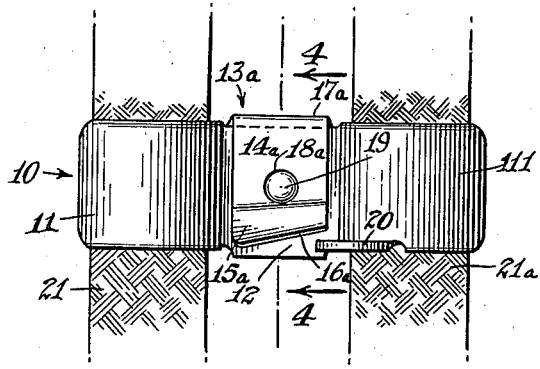
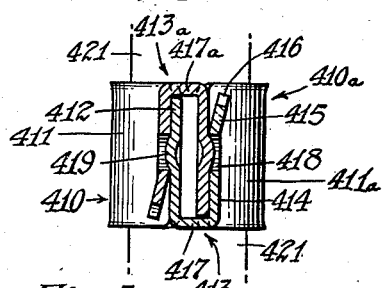
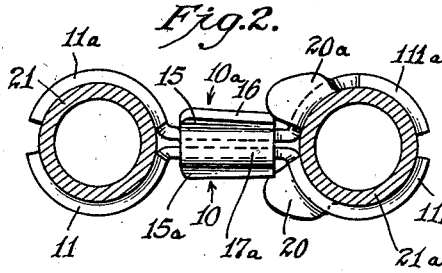
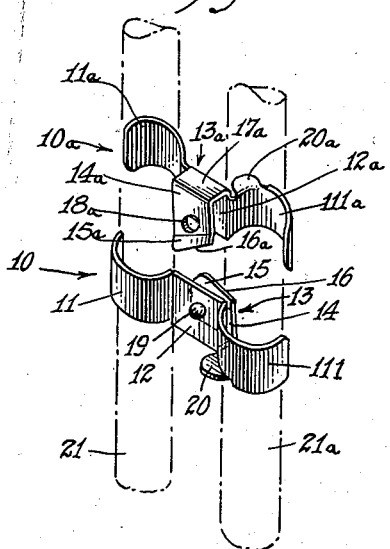
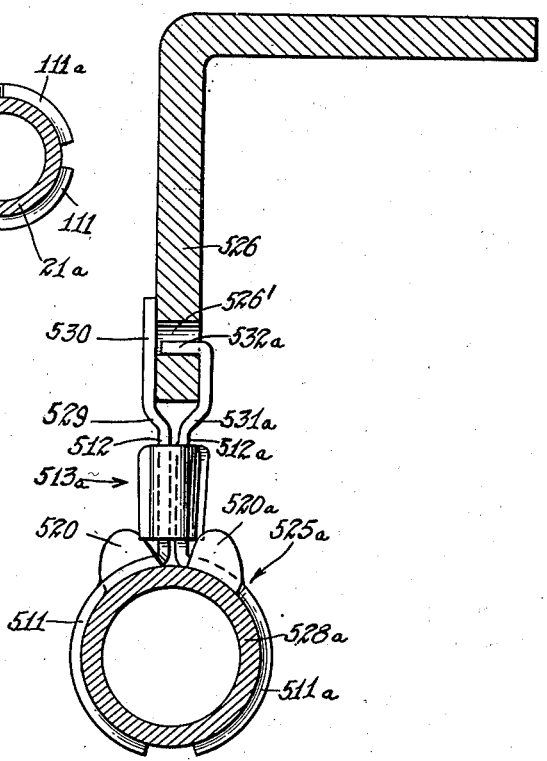
INVENTOR
JOSEPH W. WOHLHIETER
BY
Ramsey, Kent and Chisholm
ATTORNEYS Patented Oct. 30, 1945

2,388,201

UNITED STATES PATENT OFFICE 2,388,201

CLAMP

Joseph W. Wohlhieter, East Orange, N. J., assignor to The Palnut Company, Irvington, N. J., a corporation of New Jersey Application June 8, 1943, Serial No. 490,051

7 Claims. (Cl. 24—81)

This invention is concerned with clamps, usable for various purposes, as for example the holding of pipes or electrical conductors in spaced-apart relation. A familiar type of such devices comprises a pair of identical strap members or half-clamps each having a flat intermediate body portion, with a half-round seat or object-engaging clasp portion at each end of the intermediate portion. The two half-clamps are assembled with the intermediate body portions in contact and with the seats facing each other and in enclosing relation to the pipes or conductors, and a machine screw passes through the intermediate portions of the half clamps and engages a self-locking nut, the clamp parts being gradually brought together into clamping relation with the pipes or conductors as the screw is turned to advance it through the stationarily held nut. With such an arrangement there are four separate pieces to be handled in assembling (leaving out of account the pipes or conductors), and three different items to be ordered and stocked; and the difficulties of assembly and disassembly are obvious.

It is an object of my invention to provide a clamp for the purpose set forth above, consisting of but two parts, two half-clamps preferably identical in construction and interchangeable in use, and providing mutually reactive interengageable body portions (constituting central fastener portions) with half seats at the ends of the body portions to accommodate the pipes, conductors, etc.; the reaction between the body portions when interengaged holding the parts firmly together and in gripping relation with the pipes, etc. to which the clamps are applied and for the holding of which they are designed, without the need for cooperating screws, nuts or other separate fastening means.

A further object is to form the two half-clamps in such a way that they may be easily and quickly brought into the assembled relation by manually sliding them towards each other along, and with their opposed seats engaging the pipes, conductors, etc., into the necessary interengagement, which is resisted by gradually increasing reaction and friction between the central contacting surfaces of the two clamp parts and to a greater or less extent intensified by the reactions between clamp seats and pipes or conductors; and which engagement may be readily completed by a squeeze from a pair of simple pliers, resulting in the snapping of a projection on one clamp body surface into a hole or depression of the other clamp body to effect a yielding but adequate lock between them. There are special incidental formations on the clamp parts whereby on the application of a screw-driver or the like the parts may be instantly disassembled.

A further objective is attained in accomplishing the objects stated above, in that the interengaged portions of the half-clamps, constituting the fastener clips thereof, present four thicknesses of material, as against two in types of clamp now in common use; this of course makes for strength in the median or body portion of the device, where bending stresses are likely to occur.

The invention will be more fully understood from the following detail description, reference being had to the accompanying drawing forming a part of this specification, and in which drawing:

Fig. 1 is a side elevation of the clamp of this invention showing the same applied to a pair of cables;

Fig. 2 is a top plan view of the same;

Fig. 3 is a perspective view showing the clamp members positioned in contact with opposite sides of the cables, and with their interlocking elements in a spaced confronting position ready for locking movement together;

Fig. 4 is a vertical sectional view of a pair of clamp members in assembly, said members being in form generally similar to those illustrated in Fig. 1, though slightly larger and having the edges of the clip portions slightly flanged radially outwardly from cylindrical form; the view being taken through a line corresponding to that indicated at 4—4 in Fig. 1; and Fig. 5 is an elevation partly in section, of a modified form of the invention.

The identical cooperative clamp members 10 and 10a shown in Figs. 1 to 3 inclusive, are provided respectively with half-round seats or clasp portions 11, 11 and 11a, 11a that extend respectively from the ends of their flat intermediate body portions 12 and 12a. The two body portions 12, 12a, when the clamp is assembled, accordingly bridge the space between the objects clamped and may constitute a brace therebetween effective as a stay or strut, or both, depending upon the nature of the external forces to which the objects clamped are subject. Each body portion (in the case of the identical half-clamp structures depicted) is further designed so as to function, with its mate, as the fastening means for maintaining the half-clamps in mutual assembly upon the objects disposed therebetween. To accomplish this fastening function, each body portion is provided with a lug bent over sharply to form a stirrup 13 or 13a, the outer wall 14 or 14a of which is spaced from the body portion, the spacing being at the maximum at the inner end 17 or 17a of the stirrup and progressively less towards the outer open end of the stirrup, except that the lower free end 15 or 15a thereof may be reversely flared, i. e., inclined away from the plane of part 12 or 12a, and with its lower edge cut on the bias, as indicated at 16 and 16a.

Walls 14 and 14a are provided with circular holes 18 and 18a, and part of the flat body portions 12 and 12a are displaced in the direction away from the interior of the stirrup to form pimple projections 19 and 19a substantially in line with holes 18a and 18. Fulcrum lugs 20 and 20a are bent outwardly at right angles from the edge of the seats 111 and 111a adjacent the bight 17 of stirrup 13 and bight 17a of stirrup 13a respectively.

The clamp is operated by placing the pair of members 10, 10a oppositely against a pair of ignition cables or pipes, or the like, 21, 21a, with their respective seats 11, 11a and 111, 111a conforming mutually to the curvature of the cables, and with the open end of the stirrups 13, 13a in a confronting position longitudinally of the cables, as shown in Fig. 3. Members 10, 10a may then be slid along the cables toward each other and into a position in which the respective flared ends 15, 15a of the stirrups will overlie the respective flat parts 12a, 12. Pressure is then applied to the bight portions 17, 17a with pliers, and members 10, 10a are squeezed together until the projections 19, 19a and holes 18a, 18 are engaged in the fashion indicated in Fig. 4. The dimensions of members 10, 10a are such that jaws 11, 11a and 111, 111a will embrace the cables 21, 21a tightly, and walls 14, 14a will be under tension active in a direction toward the projections 19a, 19 of the opposing clamp member. Obviously, by appropriate design, including choice of material and relative sizes and relations of parts, a lock between clamp parts may be accomplished without taking into account or contemplating any reliance upon reactions between clamp seats and the parts which they enclose. I prefer, however, a design in which the lock is due partly to the reactions between clamp parts and party to the reactions between clamp seats and the cables, or the like, received therebetween, the one set of reactions strengthening the other. With such a design, of course, the cross-sectional dimensions and/or compressibility of the parts to be gripped have to be considered.

I have shown the seats 11, 11a and 111, 111a substantially semi-circular, but this is not absolutely necessary even where cylindrical parts are to be gripped; and in any case the seats may, if desired or necessary, be otherwise shaped to fit the parts to be gripped. And as already suggested, the clamp parts may by design be made so as to yieldingly interlock with each other, without any gripping action between the seats and the parts that they enclose and maintain in spaced relation.

Should it be desired at any time to remove the clamp from the cables, pipes, etc., it is only necessary to insert the blade of a screw driver between the edge 16a and the lug 20, as viewed in Fig. 1, and twist it clockwise, using the lug 20 as a fulcrum to force the members 10, 10a apart. This may be readily accomplished without damage, so that the clamp parts may be repeatedly re-used in the manner described.

The modification depicted in Fig. 4 is structurally and functionally similar, generally, to that illustrated in Fig. 1, the parts being numbered correspondingly except with the prefix numeral "4" to constitute a "400" series.

In Fig. 5 an embodiment of the invention is shown in which the structure has been modified so far as a coactive pair of the object-engaging clasp portions are concerned, thus adapting the device for use as a connecting medium between a fixed element of non-cylindrical form and an element to be supported therefrom, and in which the clasp portions at one end of each half-clamp constructed accordingly conform as heretofore to a cylindrical element, such as a length of piping, and those at the opposite end are adapted for engagement with a flat element, such as the flange 526 of an angle iron.

For this purpose, the object-engaging clasp portions 511, 511a may be of increased size suitable to appropriately embrace ordinary piping indicated at 528a. Otherwise this end of each half-clamp and the intermediate stirrups 513, 513a, are similar to corresponding parts of clamp members 10, 10a shown in the preceding figures of the drawing.

In this instance, however, the configuration of the opposite object-clasping end of the clamp is adapted to conform to an object of different shape, but without interfering with the required relative movement of the clamp members to effect their locking engagement longitudinally of said pipe and flange.

More specifically, one half-clamp member of this structure consists of a body 512 provided at one end with the object-engaging clasp portions 511 of arcuate cross-section and provided at its other end with a flat clasp portion 530 offset at 529 and adapted to engage the flange 526 of the supporting object. The cooperating half-clamp member 512a is similar except that its clasp portion for engaging the flange 526 is, beyond its offset 531a, bent inwardly at 532a for engagement with a hole 26' through the flange 26.

This example of the invention is applied by inserting the inwardly-bent end 532a of the clasp portion (carried by the half-clamp member having the offset 531a) into the hole 526' of the object 526, and placing the clasp portion 511a of this member in partial encirclement upon the object 528a. The other half-clamp member 512 is next positioned so that the stirrups 513, 513a of the fastening portions of the two half-clamp members assume the initial confronting position heretofore described (see Fig. 3). In this initial confronting position, the clasp portion 511 of the half-clamp member 512 is also in partially-encircling contact with the object 528a, but is offset with respect to the position of the other half-clamp engaged therewith. The clasp portion 530 of this last-applied half-clamp member is, at this time, in flatwise contact with the opposite side of the flange 526 of the object, but is similarly offset with respect to the end 532 of the other half-clamp member. The member bearing the flat clasp portion 530 may now be slid along the object 528 and flange 526 into alinement with the member having the bent end 532, and the interlocking of the members effected in the manner set forth with respect to the devices of Figs. 1 to 4.

The half-clamp members having the portions 29, 30 and 31, 32 may be separated again when desired, and from either side of flange 526, by the indicated use of the fulcrum lugs 520 or 520a and the inclined edges with which they are provided corresponding to those 16a, 16 in the case of the device of Figs. 1 to 3.

It will be obvious that further modifications of a similar nature might be employed for various adaptations to other useful purposes within the scope of the invention claimed.

I claim:

1. A clamp for bridging attachment to two spaced objects, said clamp consisting of only two pieces and comprising: a strap member having a body portion and two spaced clasp formations for engaging respectively one face of each of the objects, a second strap member having a body portion and two spaced clasp formations for engaging respectively the opposite face of each of the objects, and means for interlocking the two strap members by edgewise relative movement of said strap members with each in said engagement with both of the objects, said means comprising a spring clip integral with one of the strap members and laterally spaced from the body portion thereof to receive and retain the body portion of the other strap member beneath it.

2. A clamp for bridging attachment to two spaced objects, said clamp consisting of only two pieces and comprising: a strap member having a body portion and two spaced clasp formations for engaging respectively one face of each of the objects, a second strap member having a body portion and two spaced clasp portions for engaging respectively the opposite face of each of the objects, and means for interlocking the two strap members by edgewise relative movement of said strap members with each in said engagement with both of the objects, said means comprising a spring clip integral with one of the strap members and laterally spaced from the body portion thereof to receive the body portion of the other strap member beneath it, said spring clip having a portion thereof snap-engageable with part of the received body portion of the other strap member for resisting inadvertent edgewise dissociation of the two strap members when so assembled upon said objects.

3. A clamp for bridging attachment to two spaced objects, said clamp consisting of only two pieces and comprising: a strap member having a body portion and two spaced clasp formations for engaging respectively one face of each of the objects, a second strap member having a body portion and two spaced clasp formations for engaging respectively the opposite face of each of the objects, and means for interlocking the two strap members by edgewise relative movement of said strap members with each in said engagement with both of the objects, said means comprising a spring clip integral with one of the strap members and laterally spaced from the body portion thereof to receive the body portion of the other strap member beneath it, said spring clip and said therebeneath-received body portion being provided with pimple-in-socket snap-engaging portions for resisting inadvertent edgewise dissociation of the two strap members when so assembled upon said objects.

4. A clamp for bridging attachment to two spaced objects, said clamp consisting of only two pieces and comprising: a strap member having a body portion and two spaced clasp formations for engaging respectively one face of each of the objects, a second strap member having a body portion and two spaced clasp formations for engaging respectively opposite faces of each of said objects, and means for interlocking the two strap members upon said objects by edgewise relative movement of said strap members with each in said engagement with both of said objects, said means comprising a spring clip integral with one of said strap members and a spring clip integral with the other of said strap members, said spring clips being each laterally spaced from the body portion of the strap member with which it is integral to receive and retain the body portion of the other strap member beneath it.

5. A clamp for bridging attachment to two spaced objects, said clamp consisting of only two pieces and comprising: two strap members of identical structural form each having a body portion and two spaced clasp formations for engaging, in the case of one strap member, one face each of the objects and for engaging, in the case of the other strap member when inverted, the respectively opposite face of each of said objects, and means integral with each of said two thus-inversely-related strap members for interlocking same upon said objects by edgewise relative movement of said strap members with each in said clasping engagement with both of said objects, said means comprising a spring clip integral with each of said strap members, each of said spring clips being laterally spaced from the body portion of the therewith integral strap member to receive and retain the body portion of the other strap member beneath it and both of said spring clips with their respectively-received body portions of said strap members constituting, in assembly, a four-ply nested object-bridging stay-strut structure.

6. A clamp for bridging attachment to two spaced objects, said clamp consisting of only two pieces and comprising: a strap member having a body portion and two spaced clasp formations for engaging respectively one face of each of the objects, a second strap member having a body portion and two spaced clasp formations for engaging the opposite face of each of the objects, means for interlocking the two strap members by edgewise relative movement of said strap members with each in said engagement with both of the objects, said means comprising a spring clip integral with one of the strap members and laterally spaced from the body portion thereof to receive and retain the body portion of the other strap member beneath it, and a flange extending laterally outwardly from at least one of the four recited clasp formations and constituting, with the terminal edge of said laterally-disposed spring clip, a pair of projections for the reception of clasp-unlocking effort manually imposable by a simple tool.

7. A clamp for bridging attachment to two spaced objects, said clamp consisting of only two pieces and comprising: a strap member having a body portion and two spaced clasp formations for engaging respectively one face of each of the objects, a second strap member having a body portion and two spaced clasp portions for engaging respectively opposite faces of each of said objects, means for interlocking the two strap members upon said objects by edgewise relative movement of said strap members with each in said engagement with both of said objects, said means comprising a spring clip integral with one of said strap members and a spring clip integral with the other of said strap members, said spring clips being each laterally spaced from the body portion of the therewith integral strap member to receive and retain the body portion of the other strap member beneath it, and means for unlocking said clips from each other comprising flanges extending laterally from edges of said clasp formations and constituting, with the terminal edges of said laterally-disposed spring clips, sets of projections for the reception of clasp-unlocking effort manually imposable by a simple tool.

JOSEPH W. WOHLHIETER.